March 17, 1925.
C. BORNMANN
BOX CAMERA
Filed March 24, 1924
1,530,029
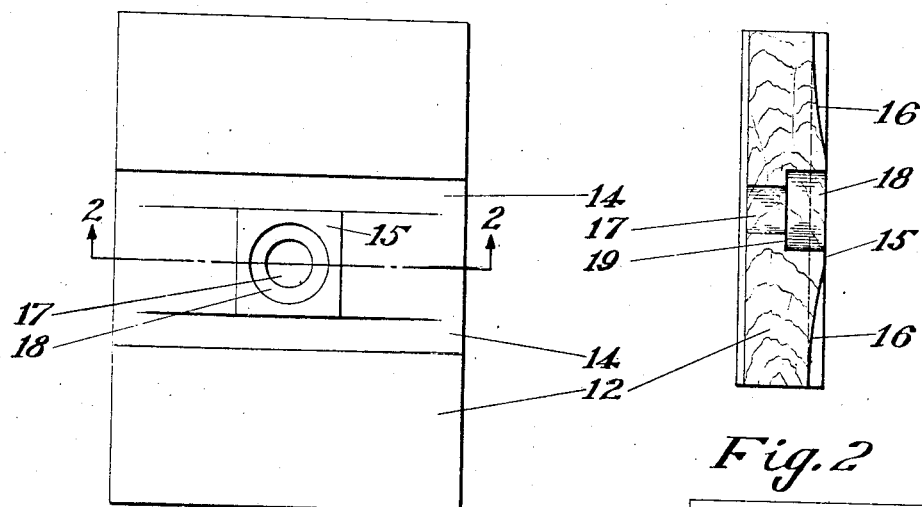
Fig. 1
Fig. 2
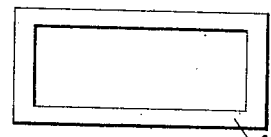
Fig. 4
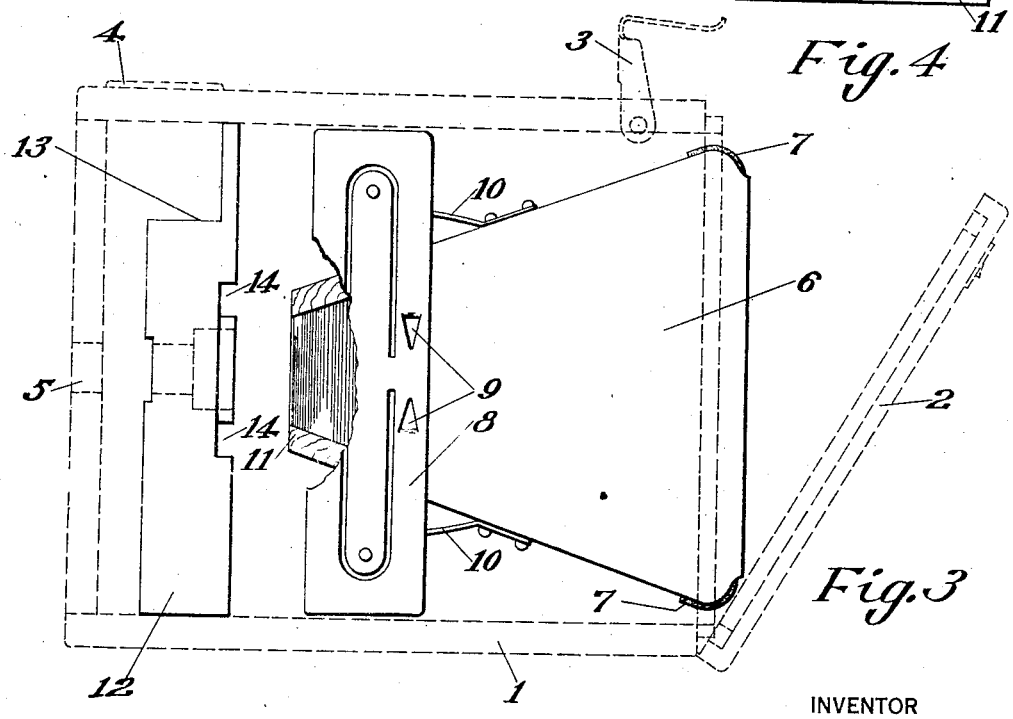
Fig. 3
INVENTOR
CARL BORNMANN
BY
Philip S. Hopkins
ATTORNEY Patented Mar. 17, 1925.

1,530,029

UNITED STATES PATENT OFFICE.

CARL BORNMANN, OF BINGHAMTON, NEW YORK, ASSIGNOR TO ANSCO PHOTOPRODUCTS, INCORPORATED, OF BINGHAMTON, NEW YORK.

BOX CAMERA.

Application filed March 24, 1924. Serial No. 701,443.

*To all whom it may concern:*

Be it known that I, CARL BORNMANN, a citizen of the United States, and a resident of the city of Binghamton, county of Broome, and State of New York, have invented a new and useful Improvement in Box Cameras, of which the following is a description, reference being had to the accompanying drawing, which forms a part of this application.

My invention relates to photographic cameras and particularly to that type known as box cameras. More specifically my invention contemplates a novel construction and arrangement of the parts of such a camera whereby an effective light trap is provided to protect the interior of the camera from actinic light.

The primary object of my invention is to provide a lens and shutter board or block so constructed that cooperating with the cone or film carrying member of the camera such a light trap or lock is formed.

An other object is the provision of a novel lens cell or mount whereby a considerable saving of material and labor is effected.

Another object is to utilize the construction provided for the light trap to form an effective centering device for the film carrying cone.

A still further object is to provide a device of the character described which is simple, inexpensive, positive in operation and which greatly facilitates the assembling and operation of the camera.

Other objects and advantages in details of construction and operation will be apparent as the description proceeds, reference being had to the accompanying drawings wherein like reference numerals indicate like parts.

In the drawing:

Figure 1 is a front view of my improved shutter block and lens mount.

Figure 2 is a cross section of the same taken on line 2—2 of Figure 1.

Figure 3 is a side view of a camera embodying my invention the outer box being shown in dotted lines. The inner cone is shown in the position it occupies just prior to being inserted to normal working position within the box, certain parts being broken away to more clearly illustrate the construction and operation.

Figure 4 is a detail showing the outline of the front of the film carrying cone.

By the reference numeral 1 I have indicated a conventional outer shell of a box camera which is provided with the usual hinged back 2, catch or securing means 3 for said back, finder 4, and exposure opening 5 in the front of said box.

The film carrying member 6 is shown conical in shape and is provided at the rear thereof at top and bottom with strips 7 of velvet, felt or other material over which the film (not shown) is drawn. A film spool holder 8 is secured to the side of the cone by means of prongs 9 or other suitable fastening means. Tension springs 10 are mounted on the cone in position to engage with the film spools (not shown) to prevent overrunning thereof. As shown, the front end 11 of the cone 6 is rectangular in form and protrudes slightly beyond the film holders 8, there being of course a second holder mounted upon the opposite side of the cone from that shown in Fig. 3.

Securely mounted in any suitable manner near the front of the box 1 is a partition or lens and shutter block 12. This block is cut away adjacent the top and at one side thereof as at 13 to receive the finder mounts (not shown). Parallel grooves 14 are cut across the face of the block 12, defining a central section in the center of which is formed the lens mount 15. The material on either side of the lens mount 15 and between the grooves 14 is cut away on an inclined plane sloping downwardly from the top of the lens mount 15 to a depth equal to that of the grooves 14 at the edges of the block. This cut away portion is clearly shown at 16 in Fig. 2. An opening 17 is drilled or otherwise formed thru the central portion or lens mount 15 of the block and is counterbored as at 18 thus providing a shoulder 19 by means of which a lens may be securely mounted and held in place in said block.

By this construction I have provided a novel and practical form of lens mount eliminating the necessity of carrying the lens on the front of the cone 6. A considerable saving in material and labor is accomplished by cutting block 12 in this manner to provide sufficient material for the formation of a lens mount.

The rectangular front of the cone 6 is designed to fit into the grooves 14 thereby accomplishing the double purpose of effectively stopping any light which might leak around the lens cell or at the edges of the block 12 from reaching the film carried by the cone, and to provide a practical centering means for the cone so that when the same is placed in position in the box the winding key (not shown) will always properly engage in the end of the film spool.

The operation of my invention will be obvious from the foregoing description and therefore need not be again outlined. It will be clear to those skilled in the art that my invention is susceptible to various changes and modifications without departing from the scope thereof and I do not limit myself to the specific form disclosed other than by the appended claims.

I claim:

1. A photographic camera comprising an outer box, a film carrying member and a lens mount including a block in said outer box having two parallel grooves therein, the material between said grooves being cut away at the sides of said block leaving the central portion therof intact, said central portion being provided with a lens opening.

2. A photographic camera comprising an outer box, a film carrying member and a block provided with two parallel grooves, the material between said grooves being provided centrally thereof with a lens mount and said material being cut away on either side of said lens mount downwardly to the edges of said block and the inner end of said film carrying member being adapted to fit into said grooves and around said lens mount.

3. A photographic camera comprising an outer box, a film carrying member and a block provided with two parallel grooves, the material between said grooves being cut away toward the edges of said block leaving a lens mount centrally thereof and in the same plane with the face of said block, the inner end of said film carrying member being adapted to fit into said grooves and engage around said lens mount.

4. A lens mount for photographic cameras comprising a block provided with two parallel grooves, the material between said grooves being provided centrally thereof with a lens opening, said material on either side of said opening being cut away downwardly to the edges of said block.

5. A lens mount for cameras comprising a wooden block provided with two parallel grooves across the face thereof, the material between said grooves being cut away on a bevel toward the edges thereof leaving the central portion thereof in the same plane with the face of said block, said central portion being provided with a counterbored opening for the reception of a lens.

CARL BORNMANN.